(12) United States Patent
Banner

(10) Patent No.: US 12,454,476 B1
(45) Date of Patent: Oct. 28, 2025

(54) SHELF-STABLE DECHLORINATING SOLUTIONS FOR WATER AND RELATED METHODS FOR USE AND MAKING THEREOF

(71) Applicant: Swamp Fox Innovations, LLC, Ames, IA (US)

(72) Inventor: Larry Todd Banner, Ames, IA (US)

(73) Assignee: Swamp Fox Innovations, LLC, Ames, IA (US)

( * ) Notice: Subject to any disclaimer, the term of this patent is extended or adjusted under 35 U.S.C. 154(b) by 0 days.

(21) Appl. No.: 17/561,426

(22) Filed: Dec. 23, 2021

Related U.S. Application Data

(60) Provisional application No. 63/130,351, filed on Dec. 23, 2020.

(51) Int. Cl.
*C02F 1/70* (2023.01)
*A23K 10/00* (2016.01)
*C02F 101/12* (2006.01)

(52) U.S. Cl.
CPC ................ *C02F 1/70* (2013.01); *A23K 10/00* (2016.05); *C02F 2101/12* (2013.01); *C02F 2209/29* (2013.01); *C02F 2303/02* (2013.01)

(58) Field of Classification Search
CPC .... C02F 1/70; C02F 2101/12; C02F 2209/29; C02F 2303/02; A23K 10/00
See application file for complete search history.

(56) References Cited

U.S. PATENT DOCUMENTS

| | | | | |
|---|---|---|---|---|
| 5,942,232 | A | * | 8/1999 | Costa .................... A61K 36/752 424/733 |
| 10,792,363 | B2 | * | 10/2020 | Lovelace ................. A61K 9/08 |
| 11,572,295 | B1 | * | 2/2023 | Banner ..................... C02F 1/70 |

* cited by examiner

*Primary Examiner* — Haidung D Nguyen
(74) *Attorney, Agent, or Firm* — Dentons Davis Brown; Matthew Coryell

(57) ABSTRACT

The disclosed embodiments relate to a composition for the dechlorination of water and improving the palatability of chlorinated water for livestock. In certain aspects, disclosed compositions comprise a reducing agent, a weak base, and water. Further disclosed are method for dechlorinating chlorinated water comprising combing a dechlorinating solution with chlorinated water, wherein the dechlorinating solution comprises a reducing agent, a weak base, and water.

8 Claims, No Drawings

SHELF-STABLE DECHLORINATING SOLUTIONS FOR WATER AND RELATED METHODS FOR USE AND MAKING THEREOF

CROSS-REFERENCE TO RELATED APPLICATION(S)

This application claims the benefit under 35 U.S.C. § 119(e) to U.S. Provisional Application 63/130,351, filed Dec. 23, 2020, and entitled Shelf-stable Dechlorinating Solutions for Water and Related Methods for Use and Making Thereof, which is hereby incorporated herein by reference in its entirety for all purposes.

TECHNICAL FIELD

The disclosed technology relates generally to compositions and methods for the reduction of free chlorine and related odor from drinking water for livestock.

BACKGROUND

The disclosure relates to compositions and methods for treatment of liquids such as water for use in livestock, equine, and household pet applications. When farm-raised livestock are introduced to chlorine containing municipal water, often at livestock fairs or exhibitions, they often will not drink the water. In some cases, the animal may not drink the water for several days leading to dehydration. It is understood that not only is this bad for the animal's health, but it also reduces the show appeal of animal at the exhibition. In extreme situations, the exhibitor may force-feed water to the animal. Prior approaches to reduce chlorination levels of municipal water sources for livestock consumption have utilized filters attached to the end of a hose. However, the dechlorination capacity of these filters is quickly exhausted, limiting their utility for larger volumes of water. As a result of the insufficiency of available dechlorination options, it is common for exhibitors to haul water tanks long distances at substantial cost to ensure their animals will have palatable water at exhibition sites. Accordingly, there is a need in the art for compositions and methods to increase the palatability of chlorinated water.

BRIEF SUMMARY

Described herein are various embodiments relating to compositions and methods for treatment of liquids, particularly water, and more particularly drinking water for livestock. In various implementations, the compositions are shelf-stable.

One general aspect includes a liquid composition for treatment of chlorinated liquid. The liquid composition also includes a reducing agent, a weak base, and water.

Implementations may include one or more of the following features. The composition where the reducing agent is selected from a list including of sodium thiosulfate pentahydrate, potassium thiosulfate, calcium thiosulfate, magnesium thiosulfate, and salts of thiosulfuric acid. The composition where the reducing agent is sodium thiosulfate pentahydrate. The composition where sodium thiosulfate pentahydrate is present from about 1% to about 70%. The composition where sodium thiosulfate pentahydrate is present at about 15%. The composition where the weak base in present in an amount from about 0.3% to about 0.5%. The composition including about 15% reducing agent, about 0.5% weak base, and about 84.5% water. The composition where the weak base is chosen from one or more of sodium citrate, sodium tartrate, sodium lactate, sodium ascorbate, sodium malate, sodium benzoate, sodium sorbate, sodium propionate, and sodium phosphate. The composition where the weak base is sodium citrate. The composition where the sodium citrate is present from about 0.1% to about 1.0%. The composition where the water activity of the composition is from about 0.5 (aw) to about 0.8 (aw).

Another general aspect includes a method of increasing livestock palatability of chlorinated water. The method of increasing livestock palatability includes providing a dechlorinating solution including a reducing agent and water and combining the dechlorinating solution with chlorinated water.

Implementations of the method may include one or more of the following features. The method where the reducing agent is sodium thiosulfate pentahydrate and the sodium thiosulfate pentahydrate is present from about 1% to about 70%. The method where sodium thiosulfate pentahydrate is present from about 5% to about 15%. The method where sodium thiosulfate pentahydrate is present at about 15%. The method further including of step of assessing the level of chlorine in the chlorinated water by way of a test strip, following the addition of the dechlorinating solution and where chlorine is undetectable by the test strip following the addition of the dechlorinating solution. The method where the molar ratio of the reducing agent to chlorine in the chlorinated water is about 1:2. In certain implementations, about 1 ml to about 15 ml of dechlorinating solution is added per 5 gallons of chlorinated water. In further implementations, the dechlorinating solution includes about 15% reducing agent, from about 0.1% to about 1.0% weak base, and about 84% water.

A further general aspect includes a liquid dechlorinating composition for increasing palatability of chlorinated water for livestock. The liquid dechlorinating composition including about 15% sodium thiosulfate pentahydrate, about 0.5% sodium citrate, and about 84.5% water.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

As used herein, the singular forms "a," "an," and "the" include plural referents unless the context clearly dictates otherwise. Thus, for example, reference to "an active component" refers to one or mixtures of active components, and reference to "the method for" includes reference to equivalent steps and methods known to those skilled in the art, and so forth.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Without wishing to be bound by any particular mechanism, it is hypothesized that a major reason farm-raised animals do not like municipal water is due to the chlorination treatment of the water. As used herein, "livestock palatability" means the propensity of livestock, including, in certain implementations, horses, to consume a substance. Thus, to increase, or improve livestock palatability for chlorinated water, the disclosed compositions and methods increase the propensity or affinity of livestock to consume such water following treatment.

The disclosed composition for a dechlorinating solution and related methods of use reduce the chlorine concentration in liquids, such as water. In various implementations, a dechlorinating solution comprising a pour point suppressant, a reducing agent, and water are provided, which can be mixed and combined with chlorinated drinking water to reduce the chlorination of that drinking water. This reduction in chlorine can improve the odor and taste of municipal drinking water, particularly for livestock.

Various implementations of the composition include a reducing agent. In certain aspects, an agent that reduces hypochlorite and/or reduces free chlorine is provided. In various implementations, the reducing agent is sodium thiosulfate, including hydrates of sodium thiosulfate. The reducing agent is food and feed grade, in certain implementations, such as food grade USP sodium thiosulfate pentahydrate. It is understood that other examples of reducing agents for use in the composition include potassium thiosulfate, calcium thiosulfate, magnesium thiosulfate, salts of thiosulfuric acid, other hydrates of sodium thiosulfate, and other reducing agents known to one of skill in the art. In various implementations, the reducing agent is a concentrated form of sodium thiosulfate. Without wishing to be bound to any particular theory, it is believed that dilute solutions (<about 1%) of sodium thiosulfate are not stable for long periods of time because they degrade by microbial degradation of thiobacteria.

In various implementations, the reducing agent—such as sodium thiosulfate pentahydrate-can be provided at about 0.1% to about 10.0% of the total volume. In further implementations, the reducing agent can be provided at about 0.025% to about 70.0% of the total volume. In certain implementations, the composition may include sodium thiosulfate pentahydrate ranging from about 1% to about 70% of the total volume. In a further implementation, the composition may include sodium thiosulfate pentahydrate ranging from about 5% to about 15% of the total volume. In one particular implementation, the composition includes about 15% sodium thiosulfate pentahydrate.

In certain embodiments, the disclosed dechlorination composition is shelf stable. As used herein, the term shelf stable means substantially free of sulfur odor (e.g. there has been little to no degradation of sodium thiosulfate) and substantially free of microbial growth. In certain embodiments, the disclosed composition is shelf stable for from about 3 to about 6 months. In further embodiments, the composition is shelf stable for from about 2 to about 3 years.

In certain aspects, the weak base is a salt of an organic acid. In certain implementations, the weak base is at least one of sodium citrate, sodium tartrate, sodium lactate, sodium ascorbate, sodium malate, sodium benzoate, sodium sorbate, sodium propionate, sodium phosphate and disodium phosphate. In further implementations, the weak base is a mixture of two or more of the foregoing weak bases.

According to certain implementations, the amount of the weak base is sufficient to maintain the pH of the composition at or above a pH of about 7.0. According to certain implementations of these embodiments, the weak base is present in a range from about 0.1% to about 1.0% of the total volume of the composition. In an exemplary embodiment, the weak base is present in an amount of about 0.3% to about 0.5% of the total volume of the composition. In further exemplary embodiments, the weak base is present in an amount of about 0.5% of the total volume of the composition. In still further exemplary embodiments, the amount of weak base added to the composition has a corresponding effect on the amount of water in the composition.

Various embodiments of the composition may also contain one or more agents to reduce chloramines.

In various implementations, the dechlorinating solution comprises about 15% reducing agent, such as sodium thiosulfate pentahydrate, and about 85% water.

According to certain embodiments, the composition is formulated such that water activity of the composition is less than about 0.7 ($a_w$). According to further embodiments, the composition is formulated such that water activity of the composition is less than about 0.6 ($a_w$). According to certain alternative embodiments, water activity is higher than 0.7 ($a_w$). In various embodiments the water activity of the composition ranges from about 0.5 ($a_w$) to about 0.8 ($a_w$). In exemplary implementations of these embodiments, the pH of the composition ranges from about 5.5 and about 7.0 and the water activity ranges from about 0.7 to about 0.85 ($a_w$). In further implementations, the pH of the composition ranges from about 6.0 to about 7.0.

In certain implementations, shelf stability of the composition is indicated by a pH of about 8.3 measured about 24 hours after the composition is mixed/prepared. In these embodiments, it is understood that while pH may drop below 8.3 after the first 24 hour period, a pH of 8.3 after about 24 hours post-mixing is an indicator that the composition will be shelf stable. The pH of the composition may often stabilize at about 7.0. As noted previously, compositions containing a higher concentration of sodium thiosulfate may have improved shelf stability.

Further disclosed herein is a method of increasing livestock palatability for chlorinated water, that comprises providing a dechlorinating solution comprising, a reducing agent, a weak base, and water; and combining the dechlorinating solution with chlorinated water. In certain aspects, the method further comprises the step of assessing the level chlorine in the chlorinated water following the addition of the dechlorinating solution. In exemplary aspects, the chlorine level is assessed by way of a test strip or other known process or mechanism. In further exemplary aspects, chlorine is undetectable by the test strip following the addition of the dechlorinating solution.

According to certain implementations of the disclosed methods, after the dechlorinating solution is prepared, it can be applied to/mixed with chlorinated water such that the molar ratio of reducing agent to the chlorinating substance is about 1:2. That is, in these exemplary implementations, the reducing agent (such as thiosulfate) can be added at a molar ratio of about 1:2., In one specific example, the composition can be added such that the molar ratio of sodium thiosulfate to sodium hypochlorite—the typical chlorinating substance in drinking water—is about 1:2. In alternate implementations, the molar ratio could be as low as about 1:4 or lower. Further implementations can use higher molar ratios, for example up to a ratio of about 25:1 or higher.

In various implementations, the dechlorinating solution is added to chlorinated water at a rate of about 1 ml to about 15 ml of dechlorinating solution per 5 gallons of chlorinated water. In an exemplary embodiment about 1 ml of dechlorinating solution is added per 5 gallons of chlorinated water.

It is understood that in these implementations, the free chlorine in the water is assumed to be no higher than about 4 ppm, as is the industry-standard maximum. It is further understood that in certain implementations, chlorination can be as high as about 10 ppm or more, and in these implementations, additional reducing agent would be required, as would be readily appreciated.

Illustrated below is the stoichiometry of the reaction of sodium thiosulfate with sodium hypochlorite. In this example about 1.26 g of a composition disclosed herein, containing 5% sodium thiosulfate pentahydrate, can be used to neutralize 5.0 gallons of water containing 4 ppm sodium hypochlorite.

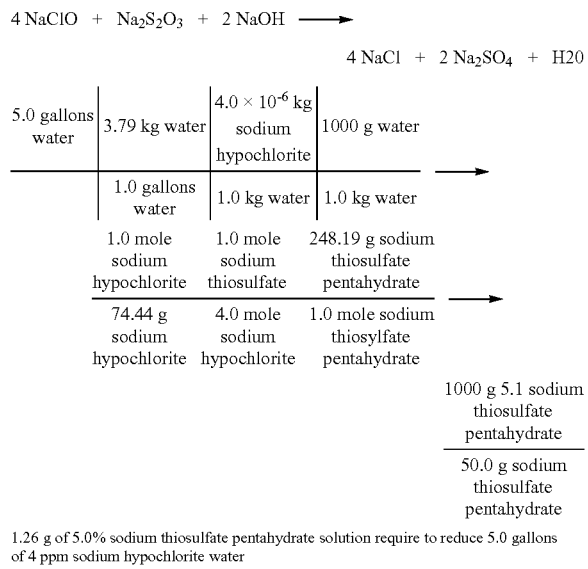

1.26 g of 5.0% sodium thiosulfate pentahydrate solution require to reduce 5.0 gallons of 4 ppm sodium hypochlorite water In certain implementations, the compositions disclosed herein are suitable for use with livestock and increase livestock palatability of chlorinated water. In further implementations, the compositions disclosed herein are suitable for use with horses and increase horse palatability of chlorinated water. In still further implementations, compositions disclosed herein are suitable for use with household pets and increase household pet palatability of chlorinated water. In yet further implementations, compositions disclosed herein are suitable for use by humans and increase human palatability of chlorinated water.

EXPERIMENTAL EXAMPLES

The following examples are put forth so as to provide those of ordinary skill in the art with a complete disclosure and description of how the articles, devices and/or methods claimed herein are made and evaluated, and are intended to be purely exemplary of the invention and are not intended to limit the scope of the disclosure. However, those of skill in the art should, in light of the present disclosure, appreciate that many changes can be made in the specific embodiments which are disclosed and still obtain a like or similar result without departing from the spirit and scope of the disclosure.

Example 1. A dechlorinating solution was prepared with the composition: 15.0% sodium thiosulfate pentahydrate and 85.0% water. The solution aged at ambient temperature for about 3.5 years with no evidence of physical, microbial, or chemical instability. Chlorinated water was simulated by first adding 35 lbs. of municipal drinking water to a 5 gallon pail. Using Hach Chlorine test strips the total chlorine was about 0.5 ppm and the free chlorine was about 0.0 ppm. Next, 1.0 grams of Clorox Bleach (6% sodium hypochlorite) was added to the pail and stirred. The theoretical concentration of total chlorine should be about 4.2 ppm (0.5 ppm from water and 3.7 ppm from addition of sodium hypochlorite). The measured chlorine using Hach test strips was about 4 ppm for both total and free chlorine. The water also had a noticeable chlorine odor.

The chlorinated water was treated using a solution containing about 0.85 g of the sodium thiosulfate (15.0% active sodium thiosulfate pentahydrate). The solution was added to the pail containing the chlorinated water and stirred for about one minute. The water was retested for chlorine. The total chlorine was reduced to 0 ppm and the free chlorine was reduced to 0 ppm. There was no noticeable chlorine odor in the solution.

Example 2: A dechlorinating solution was prepared with the composition: 0.8% sodium thiosulfate pentahydrate, 99.2% water. The solution aged at 105° F. for about 90 days.

Next, 35 lbs. of municipal drinking water was added to a 5 gallon pail. Using Hach Chlorine test strips, the total chlorine was about 0.5 ppm and the free chlorine was about 0.0 ppm. Then, 1.0 grams of Clorox Bleach (6% sodium hypochlorite) was added to the pail and stirred. The theoretical concentration of total chlorine should be about 4.2 ppm (0.5 ppm from water and 3.7 ppm from addition of sodium hypochlorite). The measured chlorine using Hach test strips was about 4 ppm for both total and free chlorine. The water also had a noticeable chlorine odor.

Next, 15 mL of the sodium thiosulfate (0.8% active sodium thiosulfate pentahydrate) solution was added to the pail containing the chlorinated water and stirred for about one minute. The water was retested for chlorine and the total chlorine was reduced to 0 ppm and the free chlorine was reduced to 0 ppm. There was no noticeable chlorine odor in the solution.

The treated/dechlorinated water is then provided to horses, livestock, pets, humans, or other animals for improved water consumption.

Although the disclosure has been described with reference to preferred embodiments, persons skilled in the art will recognize that changes may be made in form and detail without departing from the spirit and scope of the disclosed apparatus, systems and methods.

What is claimed is:

1. A liquid composition for treatment of chlorinated liquid, comprising:
   a. sodium thiosulfate pentahydrate, present in an amount of about 15% (w/v);
   b. about 0.5% (w/v) a weak base; and
   c. about 84.5% (w/v) water,
   wherein the composition is shelf stable for at least about 6 months.

2. The composition of claim 1, wherein the weak base is chosen from one or more of sodium citrate, sodium tartrate, sodium lactate, sodium ascorbate, sodium malate, sodium benzoate, sodium sorbate, sodium propionate, and sodium phosphate.

3. The composition of claim 2, wherein the weak base is sodium citrate.

4. The composition of claim 1, wherein the water activity of the composition is from about 0.5 (aw) to about 0.8 (aw).

5. A liquid dechlorinating composition for increasing the livestock palatability of chlorinated water comprising:
   a. about 15% (w/v) sodium thiosulfate pentahydrate;
   b. about 0.5% sodium citrate (w/v); and
   C. about 84.5% (w/v) water.

6. A method of increasing livestock palatability of chlorinated water, the method comprising:
   a. providing a dechlorinating solution comprising about 15% (w/v) sodium thiosulfate pentahydrate, about 0.5% (w/v) a weak base, and about 84.5% (w/v) water;
   b. combining the dechlorinating solution with chlorinated water.

7. The method of claim 6, further comprising assessing the level of chlorine in the chlorinated water by way of a test strip, following the addition of the dechlorinating solution and wherein chlorine is undetectable by the test strip following the addition of the dechlorinating solution.

8. The method of claim 6, wherein from about 1 ml to about 15 ml of dechlorinating solution is added per 5 gallons of chlorinated water.

\* \* \* \* \*